(12) United States Patent
Gretz (10) Patent No.: US 7,834,267 B1
(45) Date of Patent: Nov. 16, 2010

(54) REVERSIBLE PROTECTIVE CABLE CHUTE WITH CABLE SHIELD AND INTEGRAL COVER PLATE

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 478 days.

(21) Appl. No.: 12/075,326

(22) Filed: Mar. 11, 2008

(51) Int. Cl.
*H02G 3/14* (2006.01)

(52) U.S. Cl. .............................. 174/66; 174/67; 174/53; 220/241; 220/242; 220/3.8; D13/177

(58) Field of Classification Search .................... 174/66, 174/67, 53, 480, 481, 135; 220/3.2, 3.5, 220/3.8, 241, 242; D8/350–353, 399; D13/156, D13/177, 152, 154, 158, 173, 169, 171, 146, D13/147, 162; 439/536
See application file for complete search history.

(56) References Cited

U.S. PATENT DOCUMENTS

| | | | |
|---|---|---|---|
| 4,688,747 A * | 8/1987 | Helmsdorfer et al. | 174/67 |
| D370,890 S * | 6/1996 | Tiberio, Jr. | D13/156 |
| D399,829 S * | 10/1998 | Reed | D13/156 |
| 6,064,003 A | 5/2000 | Moore et al. | |
| 6,793,524 B2 | 9/2004 | Clark et al. | |
| D502,386 S * | 3/2005 | Provenzano et al. | D8/350 |
| D503,156 S | 3/2005 | Provenzano | |
| 7,141,744 B2 | 11/2006 | Cloutier | |
| D554,475 S | 11/2007 | Gorin et al. | |
| D577,987 S * | 10/2008 | Corbin | D8/353 |
| D593,842 S * | 6/2009 | Corbin | D8/353 |
| 7,554,036 B1 * | 6/2009 | DeCosta | 174/66 |
| 7,563,979 B1 * | 7/2009 | Gretz | 174/66 |
| 7,654,405 B2 * | 2/2010 | Provenzano et al. | 174/66 |
| 2008/0110886 A1 | 5/2008 | Provenzano et al. | |

* cited by examiner

*Primary Examiner*—Angel R Estrada (57) ABSTRACT

A reversible one-piece protective cable chute for routing low voltage cables through walls. The protective cable chute includes a one piece cable shield including a cover plate with a cable shield extending therefrom. The protective cable chute includes two-way mounting apertures therein for mounting directly to a conventional electrical box or conventional low voltage frame. The mounting apertures include a pattern and spacing to match the bores of the electrical box or low voltage frame. An opening and passageway in the protective cable chute are capable of receiving low voltage cables for the purpose of routing them through the wall and into an adjacent room. The cable chute is capable of being mounted to an electrical box or low voltage frame in any of four orientations selectable by the installer.

16 Claims, 13 Drawing Sheets

REVERSIBLE PROTECTIVE CABLE CHUTE WITH CABLE SHIELD AND INTEGRAL COVER PLATE

FIELD OF THE INVENTION

This invention relates to the installation of low voltage wiring in buildings and specifically to a protective cable chute for routing low voltage electrical or communications cables through interior walls.

BACKGROUND OF THE INVENTION

A wide variety of low voltage components such as telephone cables, coax cables for television and interne service, wiring for home entertainment systems and surround sound, and cables for connecting computers to peripherals such as printers and facsimile machines, are prevalent in today's homes and offices. Frequently it is necessary to route these low voltage wires and cables through interior walls in order to connect low voltage components in separate rooms.

In some cases, holes are simply made in the baseboard or walls and low voltage cables are simply routed through the holes. However, this is an unsightly solution and detracts from the overall appearance of the building. One prior art device for routing low voltage components is that of U.S. Pat. No. 4,688,747 to Helmsdorfer, et al., issued on Aug. 25, 1987, which includes a wall aperture molding with a removable plate cover. The plate cover clips to the molding plate with the plate cover extending downwardly and outwardly from the molding plate to define a cable passage between the lower edge of the plate cover and the molding plate. The molding plate may be further provided with a gate slot to provide installation over pre-existing cables.

A disadvantage with prior art wall aperture moldings such as that described above is that they are not complementary with wall openings prepared for conventional electrical devices. Therefore, in order to install the prior art molding plate, a hole must be made specifically sized for the molding plate. A further disadvantage with the aperture molding described above is that it is limited to one orientation with respect to the molding plate. Prior art molding plates include a cable shield that extends outward from the wall. There are many situations in which a homeowner would desire a molding plate installation in which a cable shield or nose portion does not extend outwards, such as when it is desired to place a low voltage device, furniture, or other item close against the molding plate. In such a situation, it would be desirable to install a molding plate that did not project outward while at the same time obscuring the cable entryway from view.

What is needed therefore is a protective cable chute that is complementary to conventional electrical boxes and conventional low voltage frames and that can be attached thereto for the purposes of routing low voltage cables through walls. Furthermore, the protective cable chute should be capable of being reversed and mounted in more than one orientation with respect to the electrical box or low voltage frame, including an orientation in which no portions of the cable chute project outward from the wall to which it is mounted.

SUMMARY OF THE INVENTION

The invention is a reversible one-piece protective cable chute for routing low voltage cables through walls. The protective cable chute includes a one piece cable shield including a cover plate with a cable shield extending therefrom. The protective cable chute includes two-way mounting apertures therein for mounting directly to a conventional single gang electrical box or conventional low voltage frame. The two-way mounting apertures include a pattern and spacing to match the bores of an electrical box or low voltage frame. An opening and passageway in the protective cable chute are capable of receiving low voltage cables for the purpose of routing them through the wall and into an adjacent room. An alternative embodiment of the protective cable chute is provided for use with a two-gang electrical box or two-gang low voltage frame.

OBJECTS AND ADVANTAGES

Several advantages are achieved with the reversible protective cable chute of the present invention, including:

(1) The reversible protective cable chute provides a one-piece device for routing low voltage wires and cables through walls.

(2) The reversible protective cable chute includes embodiments that enable use with a conventional single or conventional double gang electrical box or low voltage frame for providing cable passageways through walls.

(3) As a result of its one piece construction with a cover plate integral with the cable shield, the protective cable chute does not require the manufacture of a specially designed cover plate.

(4) Several orientations or configurations are available to the installer to provide several options for an attractive installation. The reversible protective cable chute can be mounted with the cable shield extending outward or inward and with the nose portion opening oriented upward or downward, thereby enabling selection of one of four possible mounting installations for added flexibility in routing cables through walls.

(5) Mounting the protective cable chute with the cable shield extending inward enables placement of low voltage components in close proximity of the wall-mounted cable chute.

(6) Use of the reversible protective cable chute of the present invention enables an installer to utilize existing installed electrical boxes and low voltage frames for routing low voltage cables and thereby avoid the need to install additional boxes in existing buildings.

These and other objects and advantages of the present invention will be better understood by reading the following description along with reference to the drawings.

INDEX TO REFERENCE NUMERALS IN DRAWINGS 20 reversible protective cable chute, preferred embodiment
22 cover plate
24 cable shield
26 two-way mounting aperture
28 recessed interior plate portion
30 raised periphery
32 front surface of cover plate
34 vertical axis
36 countersunk area
38 first end of cable shield
40 second end of cable shield
42 cable opening
44 planar horizontal portion of cable shield
46 sloped portion of cable shield
48 vertical lip
50 lower end of sloped portion
52 sidewall
54 lower end of vertical lip
56 lower end of sidewall
58 planar bottom edge of cable shield
60 horizontal axis
62 axis perpendicular to cover plate
63 recessed area
64 rear surface of cover plate
65 opening in cover plate
66 first end of cover plate
68 second end of cover plate
70 wall
72 low voltage frame
74 bore in low voltage frame
76 mounting screw
78 low voltage cable
80 low voltage frame with flags
82 flag
84 front flange
86 recessed cavity
90 protective cable chute, second embodiment
92 recessed area
94 planar bottom edge of cable shield
96 cable opening
98 first wall
99 second wall
D1 center to center distance between mounting apertures
D2 distance of mounting aperture from end of cover plate
D3 distance interior plate portion is recessed from raised periphery
Θ1 angle of sloped portion of cable shield with respect to horizontal
Θ2 angle of bottom edge of cable shield with respect to horizontal
Θ3 angle of sidewall with respect to vertical
108 threaded bore in two-gang cable shield

DETAILED DESCRIPTION OF THE INVENTION

Figure 1:
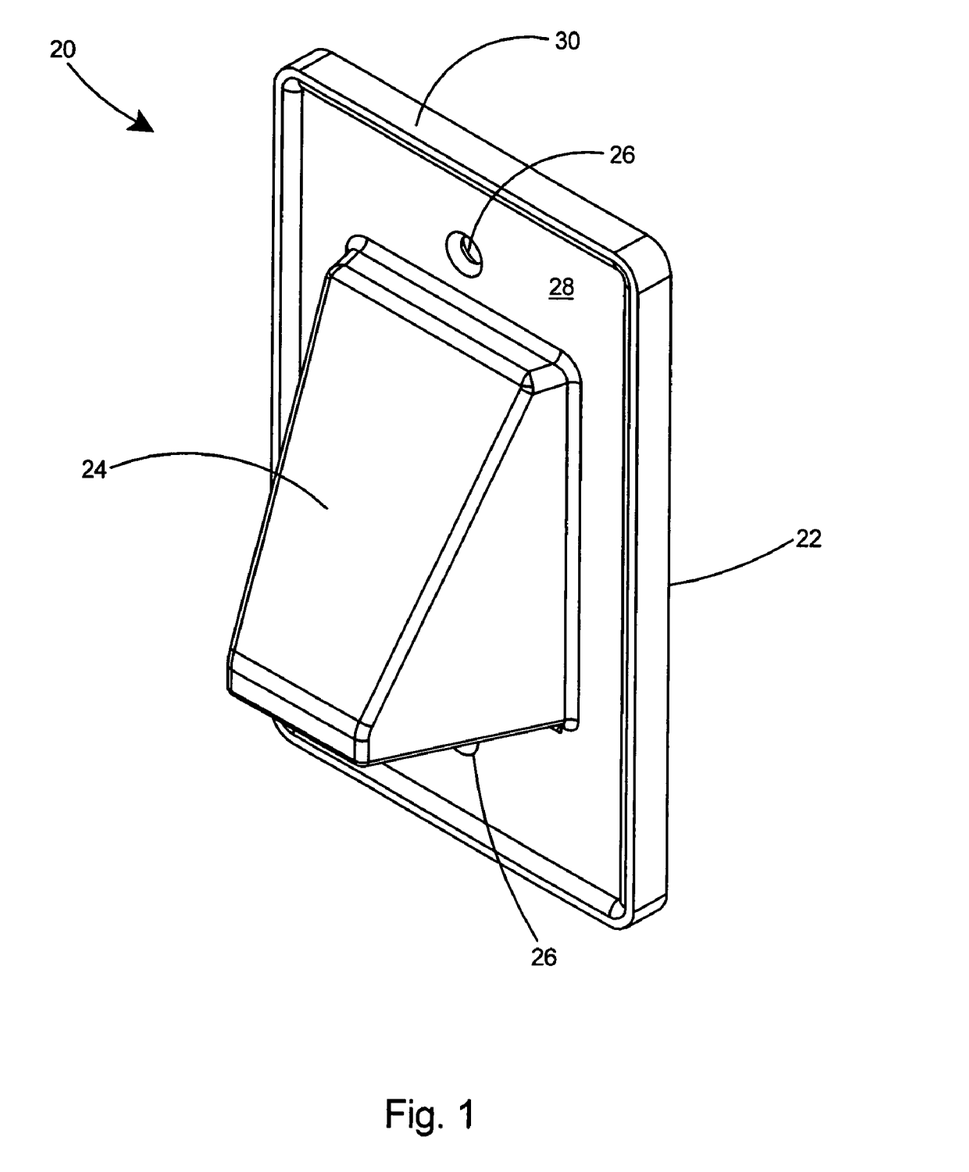
FIG. 1 is a perspective view of a preferred embodiment of a one-piece protective cable chute according to the present invention.

Referring to FIG. 1 there is shown a preferred embodiment of the present invention, a one-piece reversible protective cable chute 20. The protective cable chute 20 includes a cover plate 22 portion and an outward-extending protective cable shield 24 portion. The protective cable chute 20 further includes two two-way mounting apertures 26 for use in mounting the cable chute 20 to an electrical box or low voltage frame (not shown). The cover plate 22 includes a thin interior plate portion 28 and a raised periphery 30 extending both forward and rearward from the interior plate portion 28.

Figure 2:
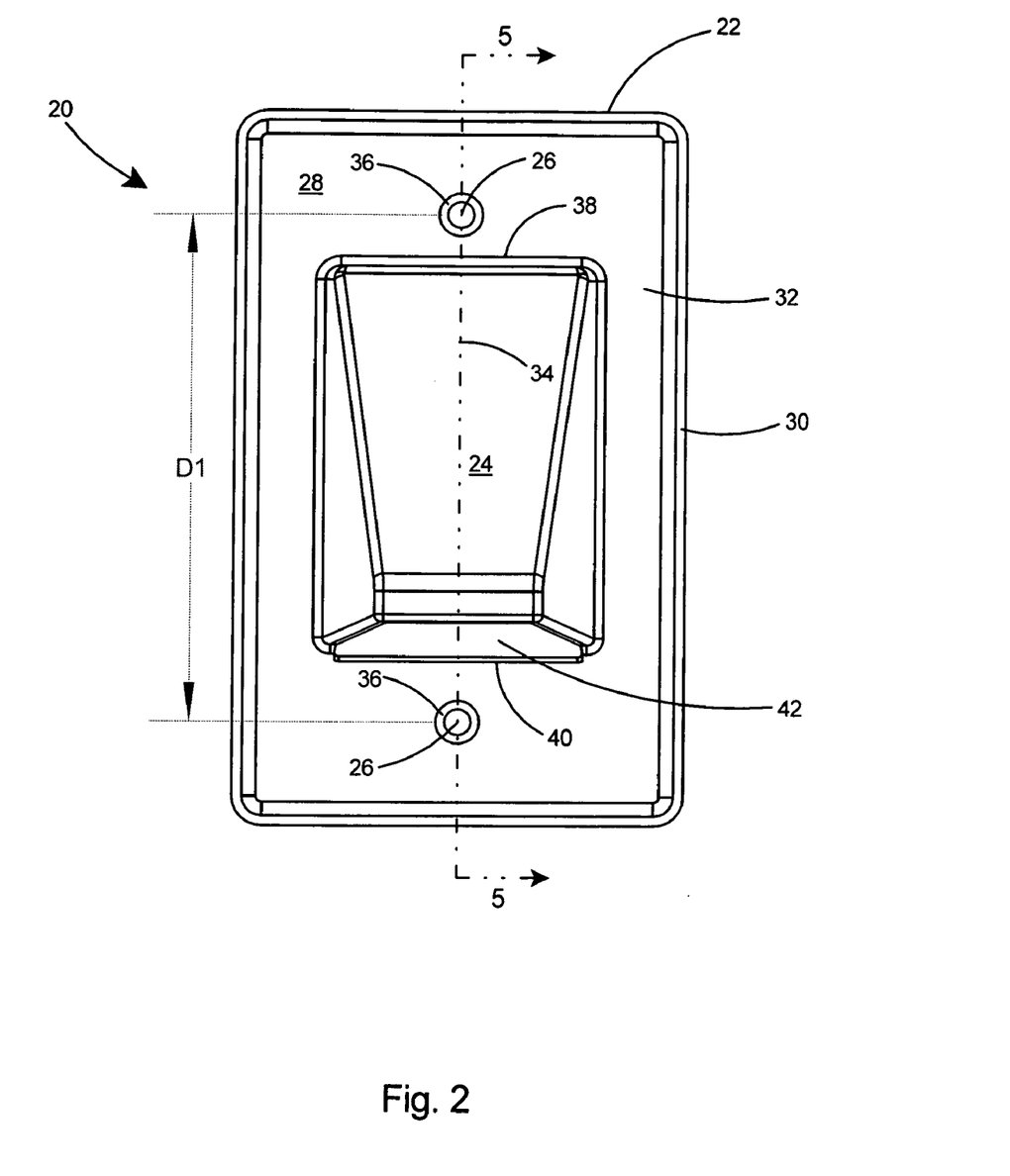
FIG. 2 is a front view of the protective cable chute of FIG. 1.

With reference to FIG. 2 depicting the front surface 32 of the cover plate 22, the two-way mounting apertures 26 are centered on the cover plate 22 along vertical axis 34 and include a center to center distance D1 that will match center to center spacing of mounting bores on a conventional electrical box or low voltage frame (not shown). Each mounting aperture 26 further includes a countersunk 36 area in the interior plate portion 28 surrounding each aperture 26. The cable shield 24 includes a first end 38 and a second end 40 and a cable opening 42 is provided at the second end 40.

Figure 3:
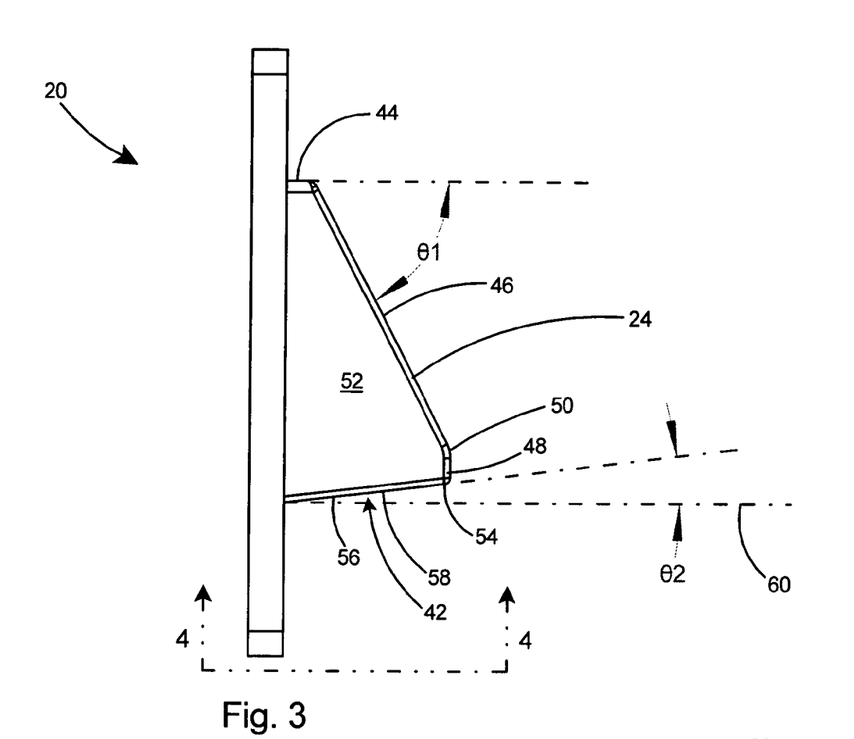
FIG. 3 is a side view of the protective cable chute of FIG. 1.

As shown in FIG. 3, the outward-extending shield 24 of the protective cable chute 20 includes a planar horizontal portion 44 extending outward from the cover plate 22 and a sloped portion 46 extending at acute angle Θ1 from the horizontal portion 44. Preferably, angle Θ1 of the sloped portion 46 is between 60 and 66 degrees. A vertical lip 48 extends downward at the lower end 50 of the sloped portion 46 of the cable shield 24. The cable shield 24 further includes two substantially triangular shaped sidewalls 52. The lower end 54 of the vertical lip 48 and the lower end 56 of the sidewalls 52 define a planar bottom edge 58 of the cable shield 24 which defines the perimeter of the cable opening 42. The planar bottom edge 58 of the cable shield 24 is preferably at an angle of Θ2 with respect to a horizontal axis 60 through the cover plate 22. Preferably, angle Θ2 is between 5 and 9 degrees with respect to horizontal axis 60. This slight angling of the bottom edge 58 of the cable shield 24 enables easier insertion of cables (not shown) therein into the cable opening 42. Angle Θ2 is preferably not greater than 9 degrees as an angle greater than this would not provide proper shielding of the cable from view from a vantage point directly in front of the protective cable chute 20.

Figure 4:
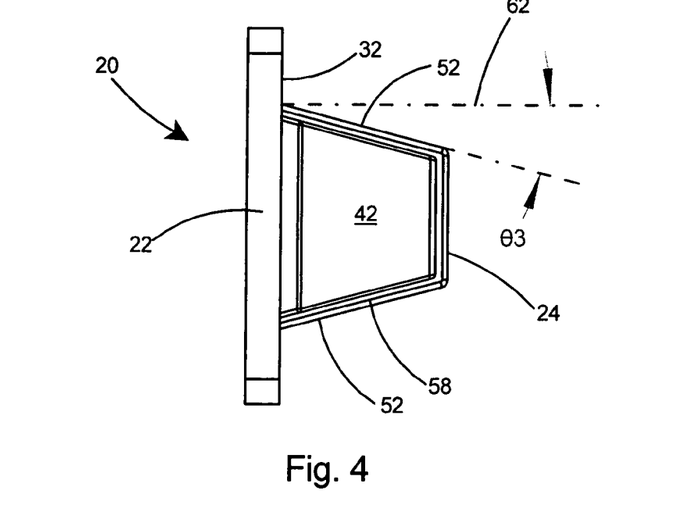
FIG. 4 is a bottom view of the protective cable chute of FIG. 3.

With reference to FIG. 4, the planar bottom edge 58 defines the periphery of cable opening 42, which cable opening 42 is a substantially trapezoidal shape as a result of sidewalls 52 sloping inward at an angle of Θ3 with respect to an axis 62 perpendicular to the front surface 32 of cover plate 22. Preferably, angle Θ3 is between 10 and 20 degrees.

Figure 5:
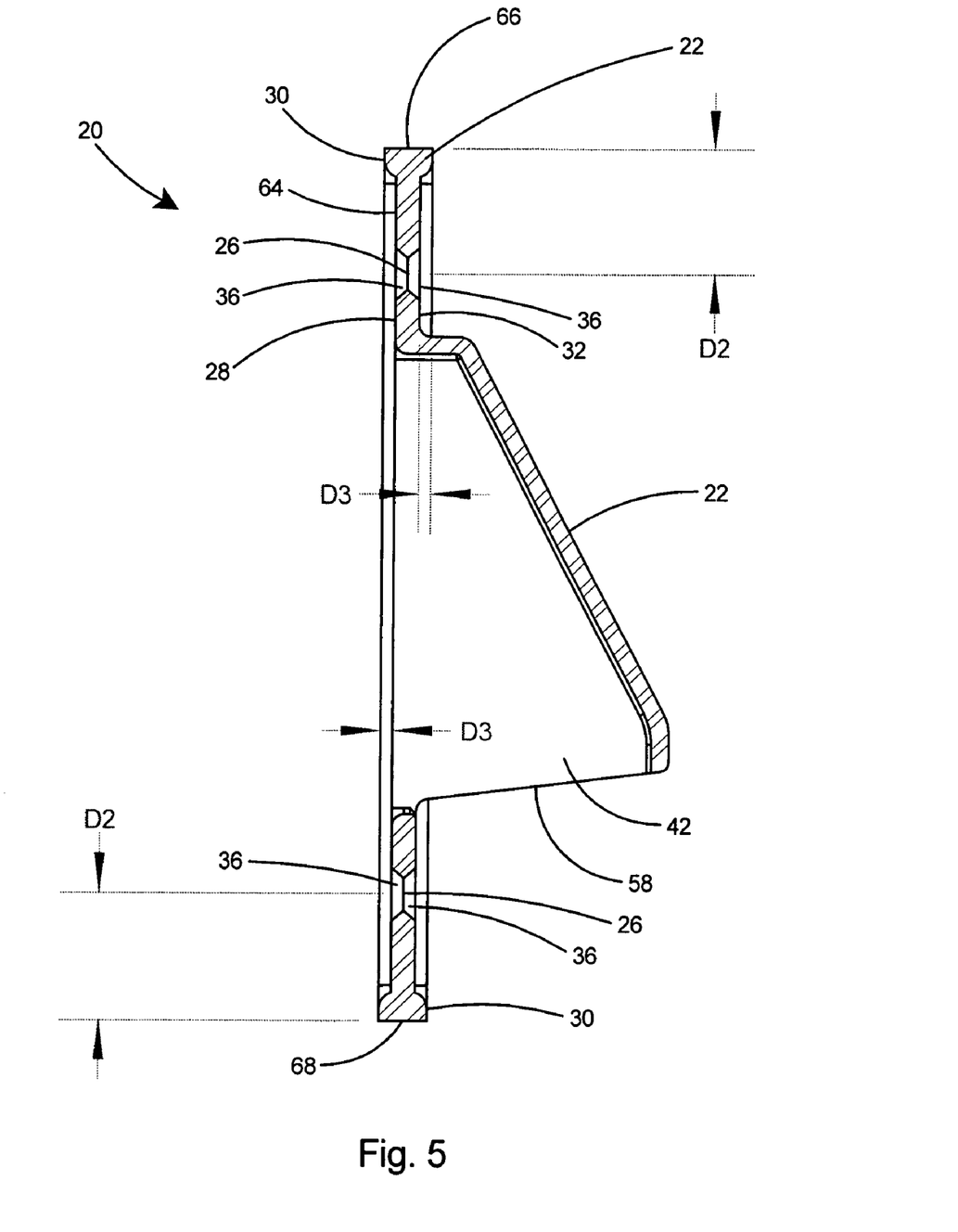
FIG. 5 is a sectional view of the protective cable chute taken along line 5-5 of FIG. 2.

Referring to FIG. 5, the protective cable chute 20 includes the interior plate portion 28 which is recessed a substantial distance from the raised periphery 30. The recessed interior plate portion 28 creates a recessed area 63 on each side of the cover plate that enables the raised periphery 30 of the protective cable chute 20, when mounted to a wall (not shown), to contact the wall. The cable chute 20 includes an opening 65 that is bordered by the cable shield 24 that extends from the front surface 32. For those situations in which the electrical box or low voltage frame (not shown) project slightly from the wall, as is often encountered, the wall is contacted by the raised periphery 30 thereby enabling the electrical box or low voltage frame to project into the recessed interior plate portion 28. This enables the protective cable chute 20 to mount flush against the wall for those cases in which the electrical box or low voltage frame project beyond the outer wall surface. The recessed area 63 on each side of the cover plate 22 is recessed a depth or distance D3 from the raised periphery 30. Preferably, the recessed depth or distance D3 is at least 0.065 inch to enable sufficient recessed area for accommodating electrical boxes or low voltage frames (not shown) that extend beyond the wall.

Figure 8:
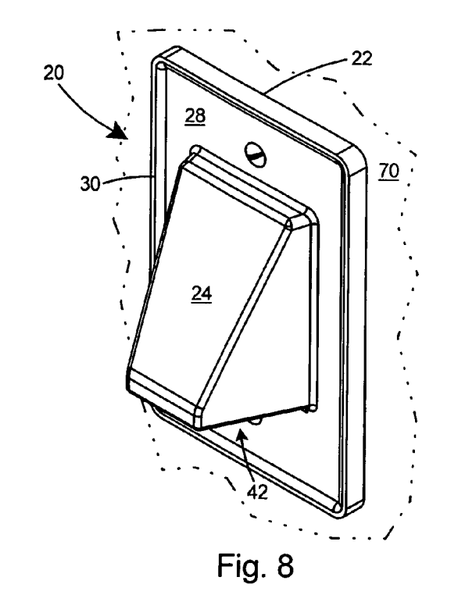
FIG. 8 is a perspective view of the protective cable chute of the present invention with the cable shield oriented outward with respect to the wall and the cable opening oriented downward.
Figure 9:
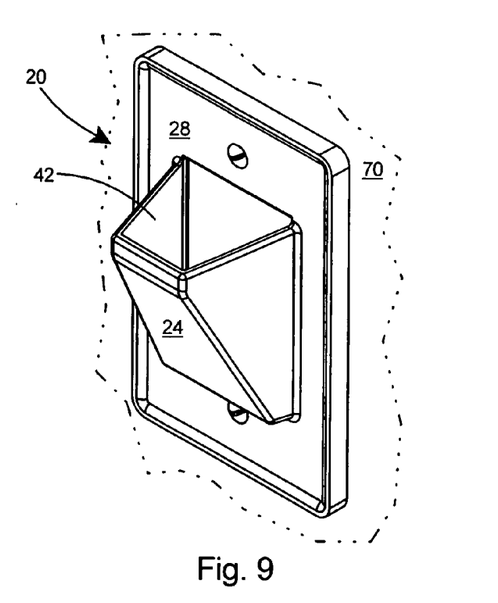
FIG. 9 is a perspective view of the protective cable chute of the present invention with the cable shield oriented outward with respect to the wall and the cable opening oriented upward.
Figure 10:
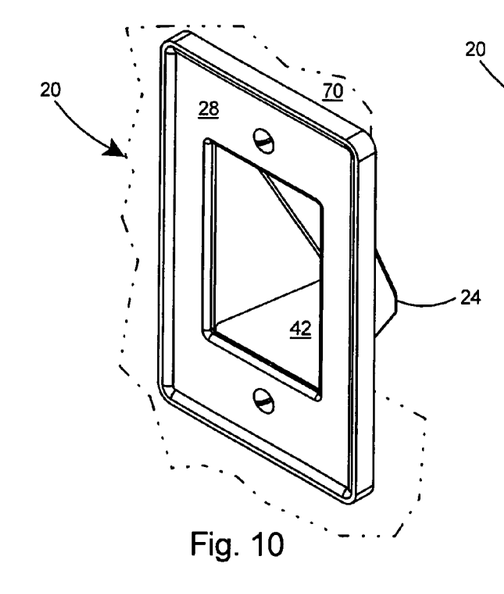
FIG. 10 is a perspective view of the protective cable chute of the present invention with the cable shield oriented inward with respect to the wall and the cable opening oriented downward.
Figure 11:
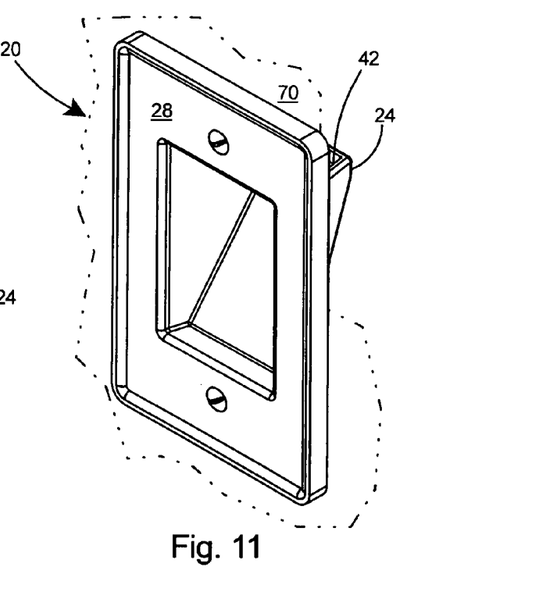
FIG. 11 is a perspective view of the protective cable chute of the present invention with the cable shield oriented inward with respect to the wall and the cable opening oriented upward.

As shown in FIG. 5, the two-way mounting apertures 26 include countersunk areas 36 surrounding the apertures 26 on both the front surface 32 and rear surface 64 of the cover plate 22. This is a critical element of the protective cable chute 20 of the present invention as it enables the cable chute 20 to be mounted with either the rear surface 64 against the wall or the front surface 32 against the wall. Furthermore the two-way mounting apertures 26 are located at equal distances D2 from either the first end 66 or second end 68 of the cover plate 22. This gives an installer the flexibility of mounting the protective cable chute 20 in any of four possible configurations or orientations including 1) a first orientation (see FIG. 8) with the cable shield 24 extending outward from the wall 70 and the cable opening 42 downward, 2) a second orientation (see FIG. 9) with the cable shield 24 extending outward from the wall 70 and the cable opening 42 upward, 3) a third orientation (see FIG. 10) with the cable shield 24 extending inward from the wall 70 and the cable opening 42 downward, and 4) a fourth orientation (see FIG. 11) with the cable shield 24 extending inward from the wall 70 and the cable opening 42 upward. This ability to mount the protective cable chute 20 in several separate orientations with respect to the wall 70 greatly enhances the flexibility of creating a functional cable shield for providing a cable passageway through a wall. The orientation of FIG. 8 for example, would be desirable for creating a cable passageway near the base of a wall in a location that does not require the positioning of a low voltage device, an appliance, or piece of furniture near the wall. The orientations of the protective cable chute 20 shown in FIGS. 10 and 11 would be useful for creating a cable passageway through a wall in a location where a low voltage device, piece of furniture, or some other object were placed close to the wall. By orienting the cable shield 24 toward the wall 70, the cable shield 24 is positioned behind the wall 70 and therefore does not interfere with an object placed in close proximity to the cable chute 20.

Figure 6:
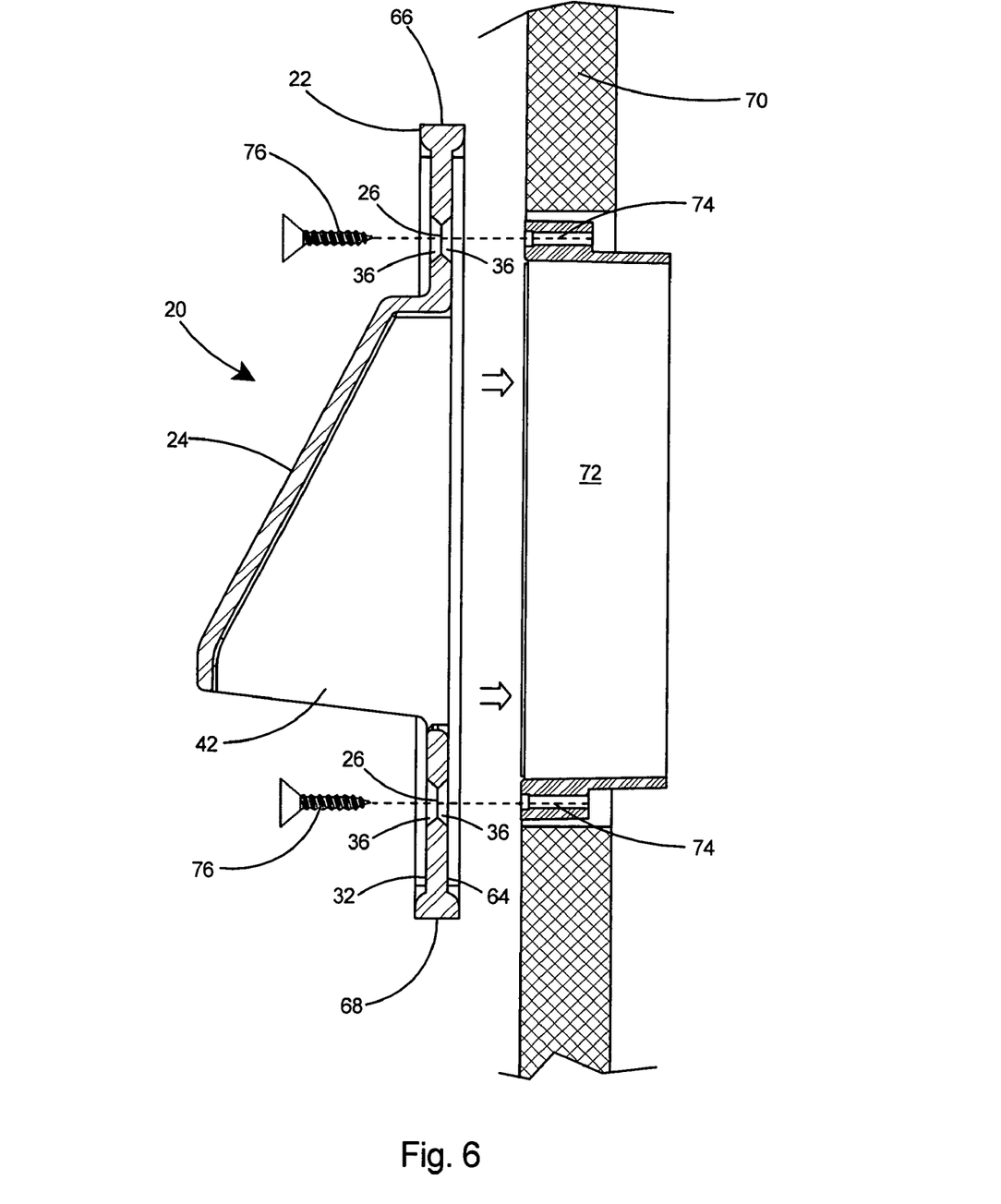
FIG. 6 is an exploded sectional view of the protective cable chute of the present invention in alignment to be mounted to a low voltage frame that is secured to a wall.

With reference to FIG. 6 there is shown a preferred embodiment of a protective cable chute 20 according of the present invention in alignment with a low voltage frame 72 to which it will be secured. The low voltage frame 72 includes bores 74 for accepting oval head or flat head mounting screws 76 from the two-way mounting apertures 26 of the protective cable chute 20. FIG. 6 depicts the cable chute 20 being mounted to the low voltage frame 72 with the cable shield 24 oriented outward and the cable opening 42 oriented downward. Although the protective cable chute 20 is shown in FIG. 6 being mounted with the cable shield 24 oriented outward and the cable opening 42 downward, it should be emphasized that, as a result of the two-way mounting apertures 26 having countersunk area 36 on each surface 32 and 64 of the cover plate 22, the protective cable chute 20 could also be flipped end 66 to end 68 or flipped around with the front surface 32 facing the low voltage frame 72 and mounted to the frame 72 in any of the four configurations or orientations shown in FIGS. 8-11 to achieve the specific objectives of the installer.

Figure 7:
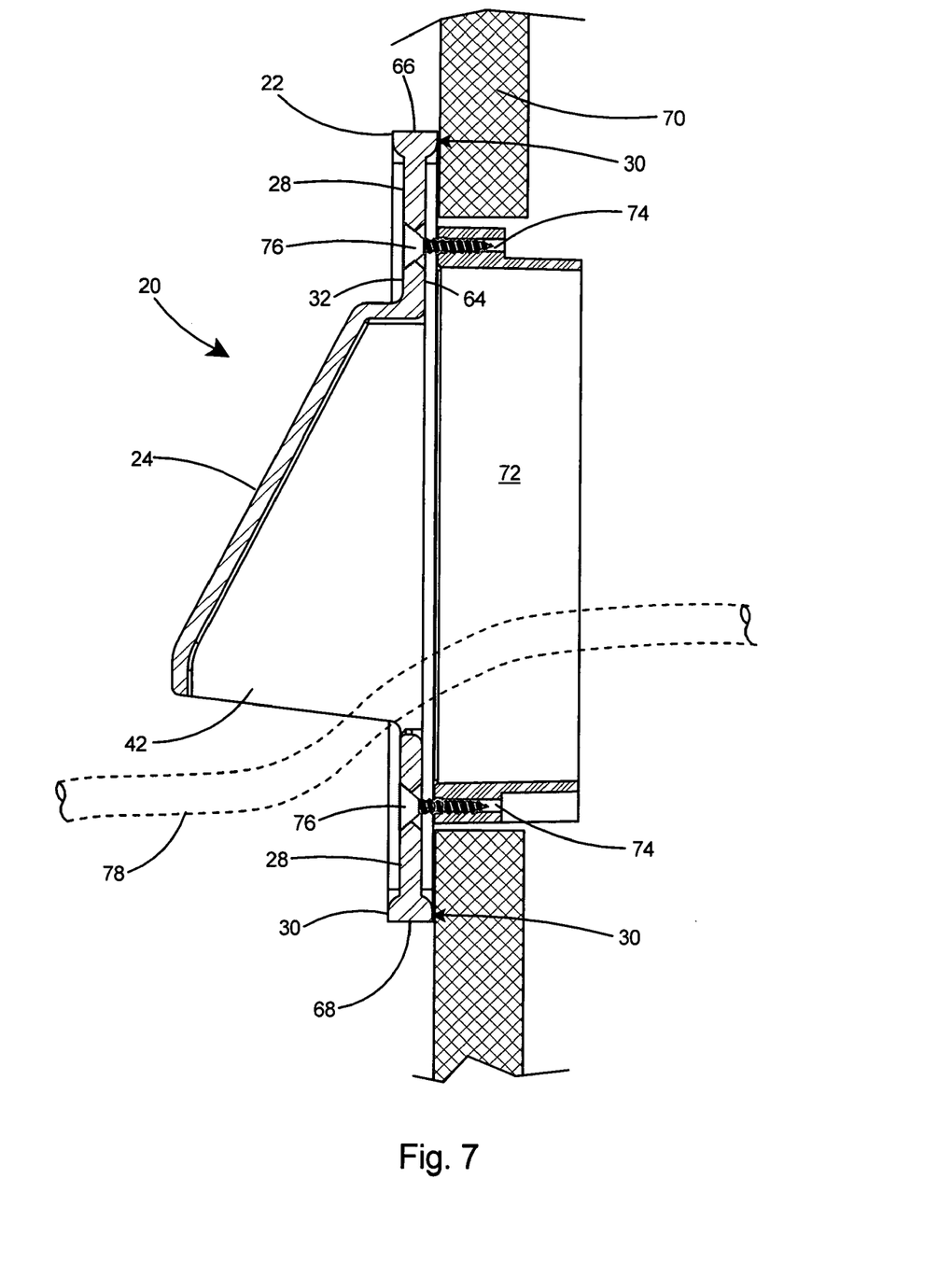
FIG. 7 is a sectional view of the protective cable chute after being secured to the low voltage frame of FIG. 6.

Referring to FIG. 7, with the mounting screws 76 fully tightened into the bores 74 of the low voltage frame 72, the protective cable chute 20 is secured to the low voltage frame 72 and to the wall 70. One or more low voltage cables 78 can then be routed through cable opening 42 and through the wall 70 as shown. The protective cable chute 20 thus provides a functional wall-mounted device for routing of low voltage cables 78. As described hereinabove, the protective cable chute 20 may be mounted in any one of four possible configurations or orientations to meet the specific needs of the installation. Regardless of which orientation is selected, the raised periphery 30 enables flush mounting against the wall 70 and the recessed interior plate portion 28, being recessed from the raised periphery 30 on both the front 32 and rear 64 surfaces of the cover plate 22, enables flush mounting against the wall even in those situations in which the electrical box or low voltage frame 72 extend slightly from the wall 70.

Figure 12:
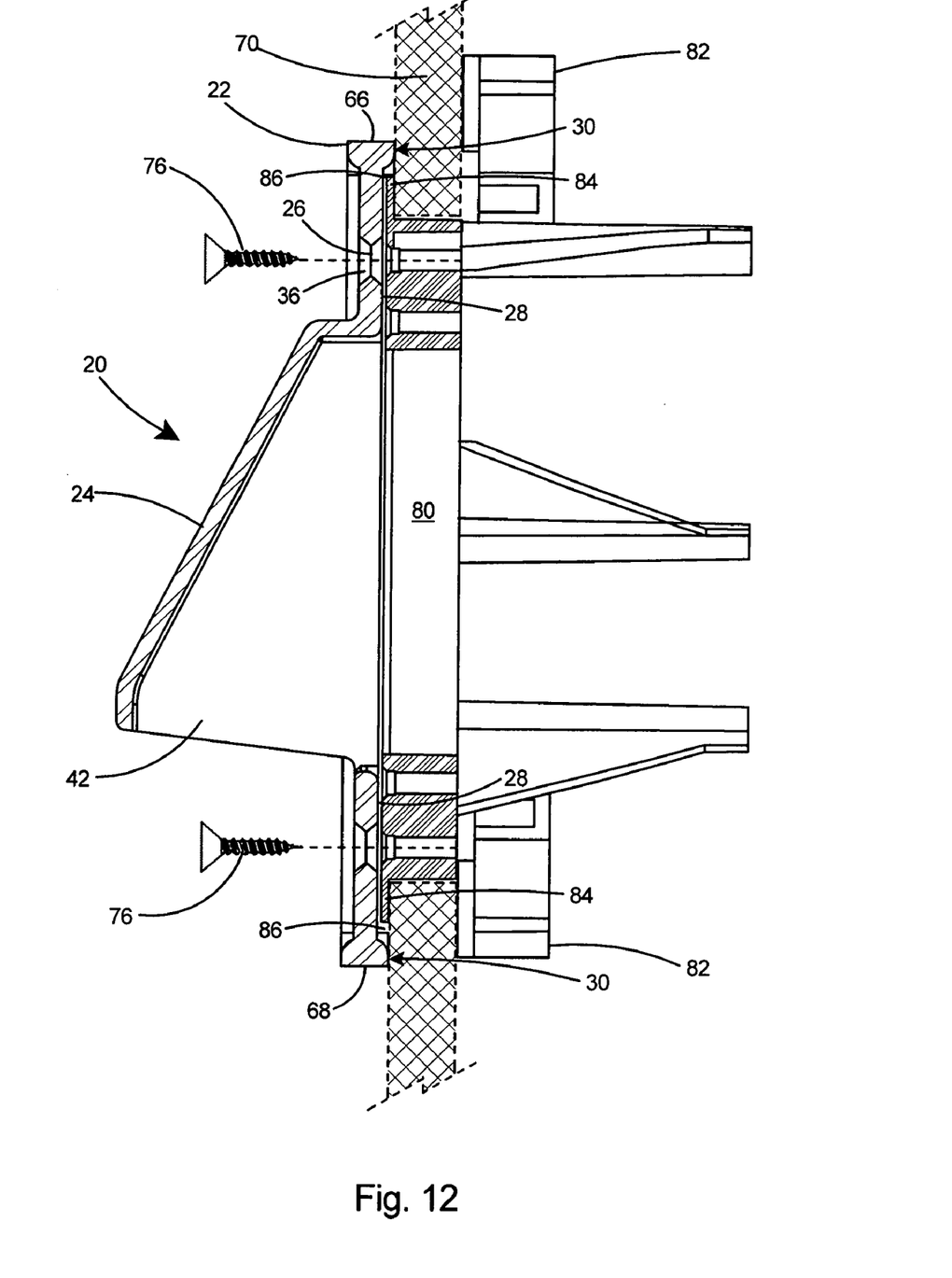
FIG. 12 is a sectional view of the protective cable chute of the present invention in alignment to be mounted to a low voltage frame of the type having rotatable flag members.

With reference to FIG. 12, there is shown the preferred embodiment of the protective cable chute 20 of the present invention flush against the wall 70 and in alignment with a low voltage frame 80 to which it will be secured with flat head mounting screws 76. The low voltage frame 80 shown is of the type having rotatable flags 82 and a front flange 84. The front flange 84 of the frame 80 extends wider than the opening in the wall 70. When rotated outwards as shown in FIG. 12, the rotatable flags 82 are tightened by screws (not shown) which pull the flags 82 toward the low voltage frame 80 and eventually clamp the low voltage frame 80 onto the wall 70 by the clamping action of the flags 82 and the front flange 84 against the wall 70. Thus, the low voltage frame 80 of FIG. 12 is of the type including a forward flange 84 for clamping to the wall. FIG. 12 therefore illustrates one potential configuration of the protective cable chute 20 of the present invention in conjunction with a low voltage frame 80 having a front flange 84. The front flange 84 projects forward of the wall 70. The raised periphery 30 and recessed interior plate portion 28 of the protective cable chute 20 therefore provide a recessed cavity 86 for accommodating the front flange 84 of the low voltage frame 80. As the recessed cavity 86 is provided on both sides of the cover plate 22, the protective cable chute 20 can be reversed or flipped end to end to achieve four separate configurations analogous to those shown in FIGS. 8-11.

Figure 13:
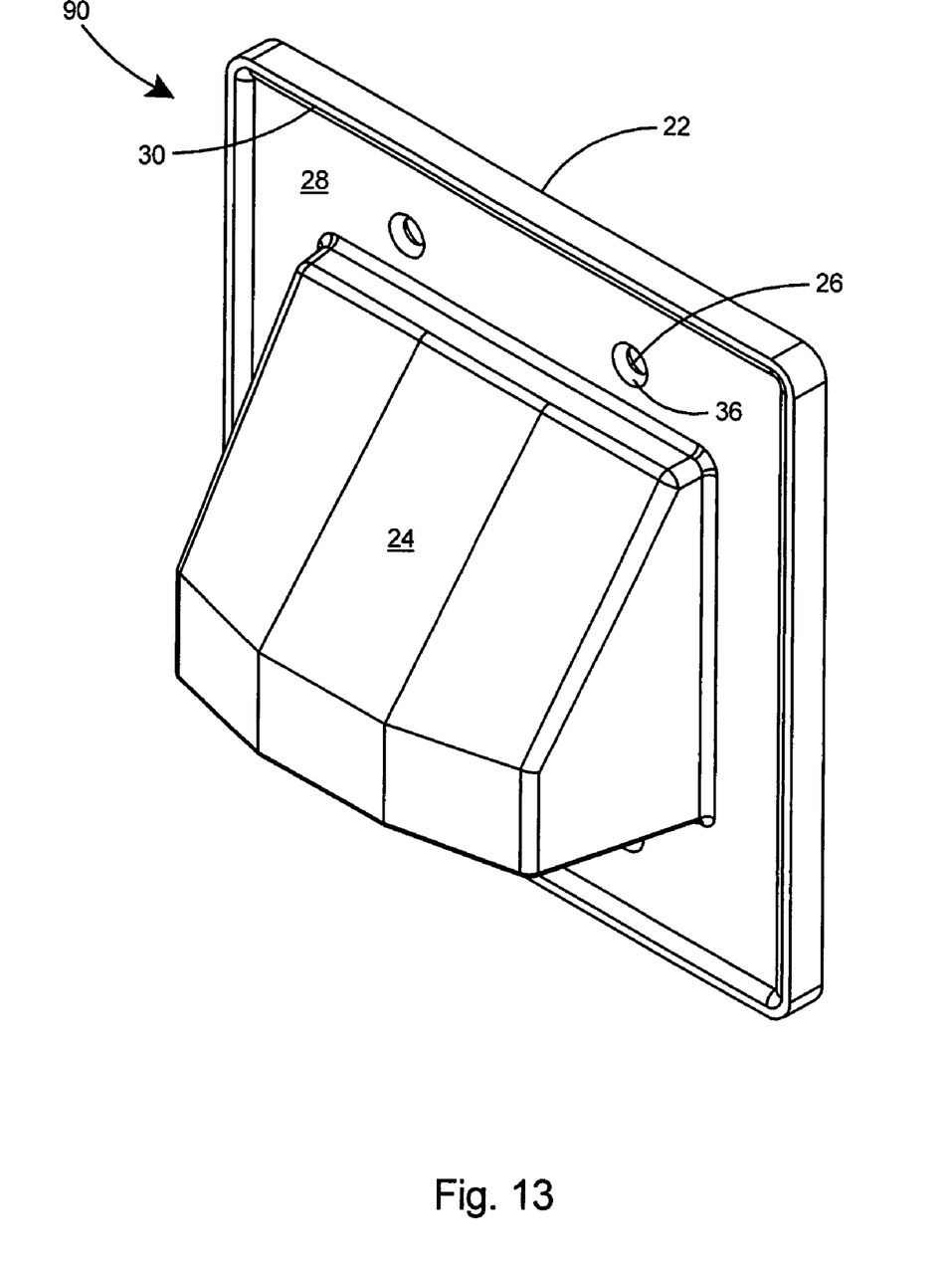
FIG. 13 is a perspective view of a second embodiment according to the present invention, a one-piece protective cable chute for a 2-gang electrical box or low voltage frame.

Referring to FIG. 13 there is shown a second embodiment of the protective cable chute which is a 2-gang cable chute 90 for use with a 2-gang electrical box or 2-gang low voltage bracket (not shown). The 2-gang protective cable chute 90 includes a cover plate 22 with a raised periphery 30 and a recessed interior plate portion 28.

Figure 14:
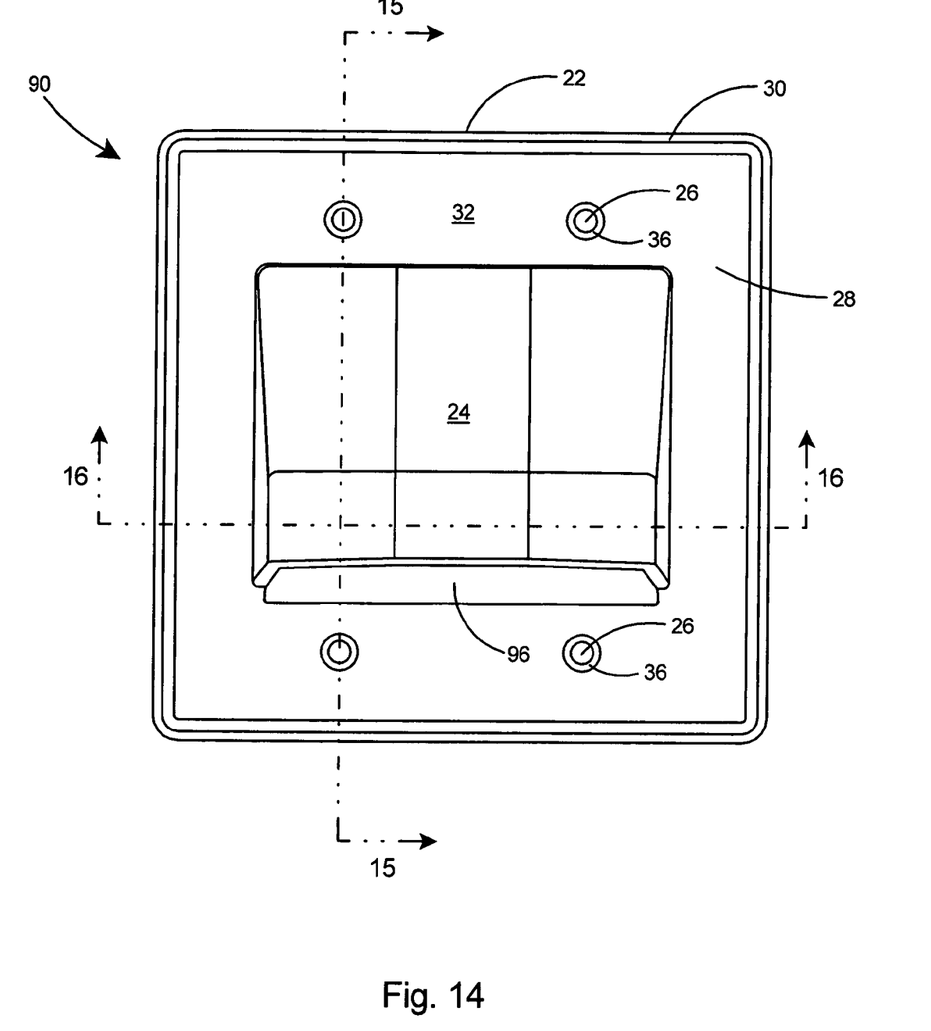
FIG. 14 is a front view of the 2-gang protective cable chute of FIG. 13.

As shown in FIG. 14, four two-way mounting apertures 26 are provided in the interior plate portion 28. The mounting apertures are of a pattern and spacing to match the bores of a 2-gang electrical box or low voltage frame (not shown). The 2-gang cable chute 90 includes a cable shield 24 projecting from the front surface 32 of the cover plate 22 and a cable opening 96.

Figure 15:
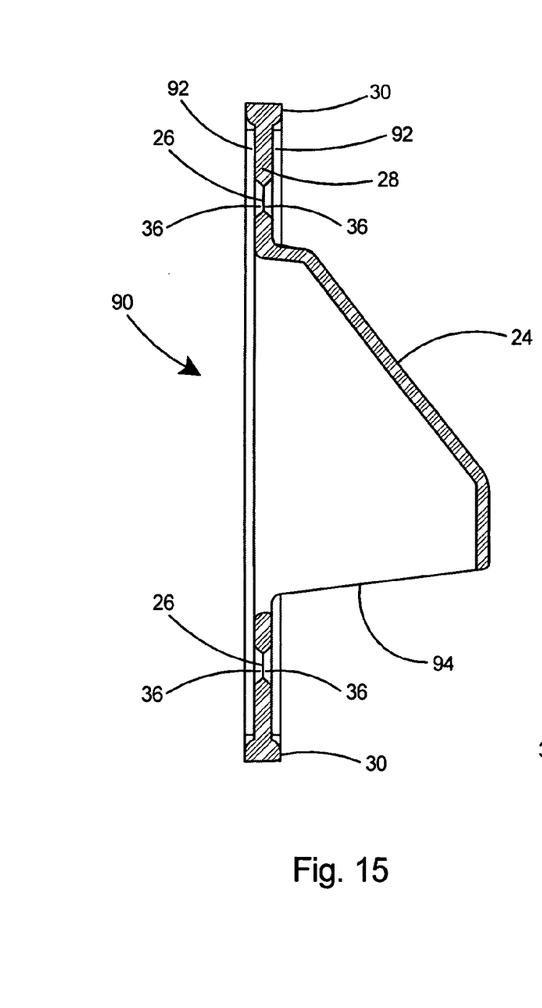
FIG. 15 is a sectional view of the 2-gang protective cable chute taken along line 15-15 of FIG. 14.
Figure 16:
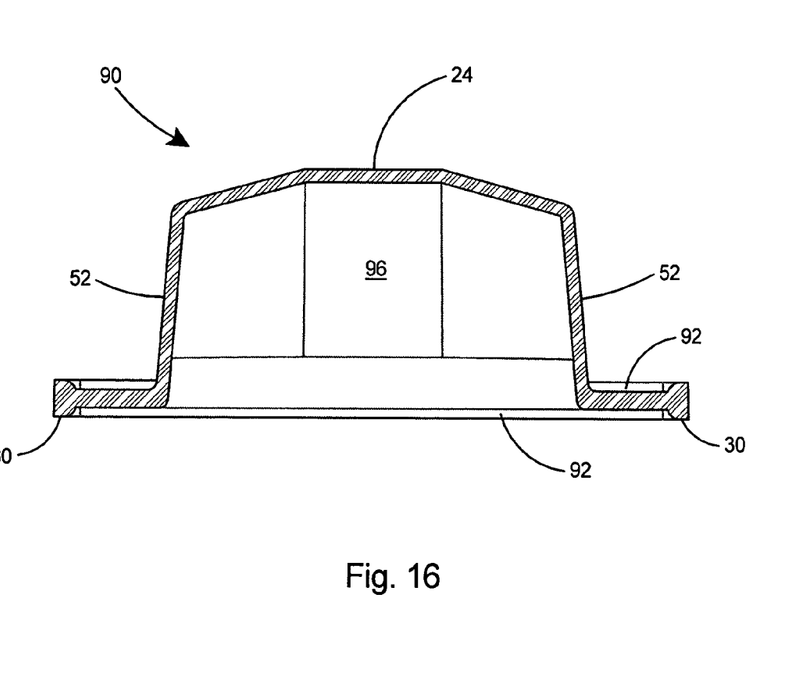
FIG. 16 is a side view of the 2-gang protective cable chute taken along line 16-16 of FIG. 14.
Figure 17:
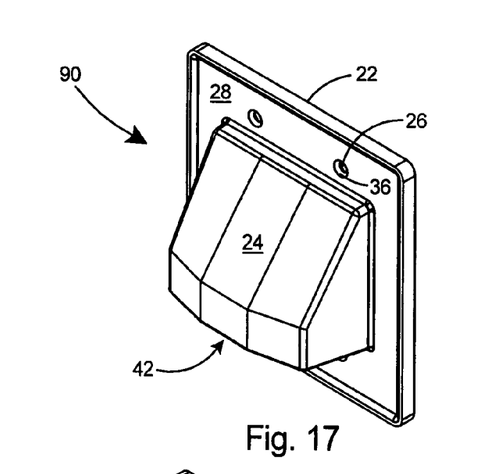
FIG. 17 is a perspective view of the 2-gang protective cable chute with the cable shield oriented outward with respect to the wall and the cable opening oriented downward.
Figure 18:
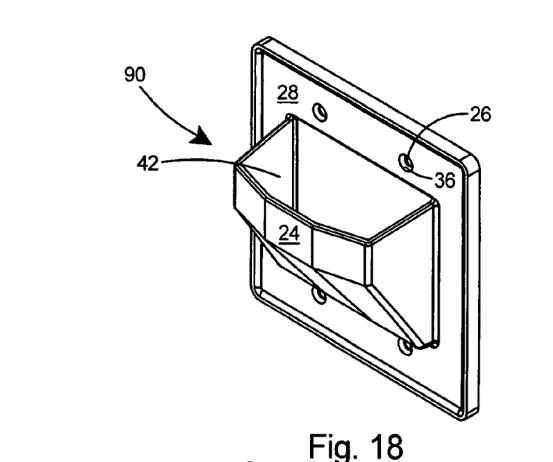
FIG. 18 is a perspective view of the 2-gang protective cable chute with the cable shield oriented outward with respect to the wall and the cable opening oriented upward.
Figure 19:
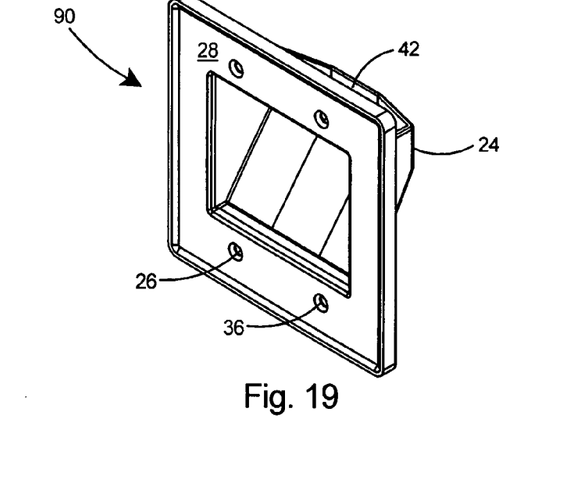
FIG. 19 is a perspective view of the 2-gang protective cable chute with the cable shield oriented inward with respect to the wall and the cable opening oriented upward.
Figure 20:
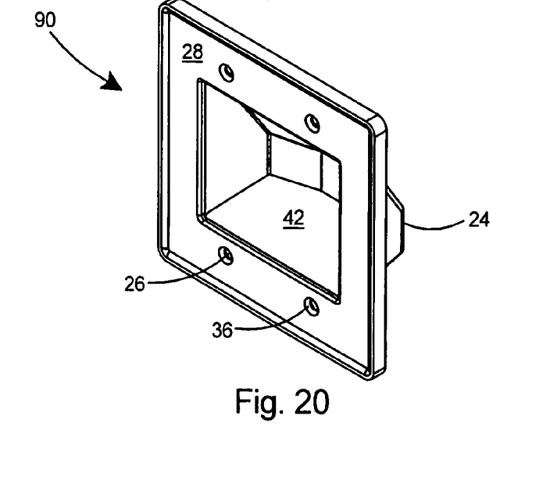
FIG. 20 is a perspective view of the 2-gang protective cable chute with the cable shield oriented inward with respect to the wall and the cable opening oriented downward.

With reference to FIG. 15, the 2-gang protective cable chute 90 includes a recessed area 92 on each side formed by the raised periphery 30 and the thinner interior plate portion 28. The two-way mounting apertures 26 include countersunk areas 36 on both sides of the cable chute 90 to enable the chute to be reversible with respect to the wall. The cable shield 24 includes a planar bottom edge 94. The 2-gang protective cable chute 90 is placed in operation by securing four mounting fasteners (not shown) through the mounting apertures 26 and into the bores in a 2-gang electrical box or 2-gang low voltage frame (not shown). As with the first embodiment of the protective cable chute described hereinabove, the 2-gang protective cable chute 90 may be secured to a 2-gang box or frame in any one of four configurations. As shown in FIG. 16, the cable shield 24 is wider than the cable shield of the first embodiment and forms a cable opening 96 of polygonal shape.

As a result of the two-way mounting apertures 26 having countersunk areas 36 on each side of the cover plate 22, the 2-gang protective cable chute 90 could be mounted to an electrical box or low voltage frame (not shown) in any of the four configurations or orientations shown in FIGS. 17-20 to achieve the specific objectives of the installer.

Figure 21:
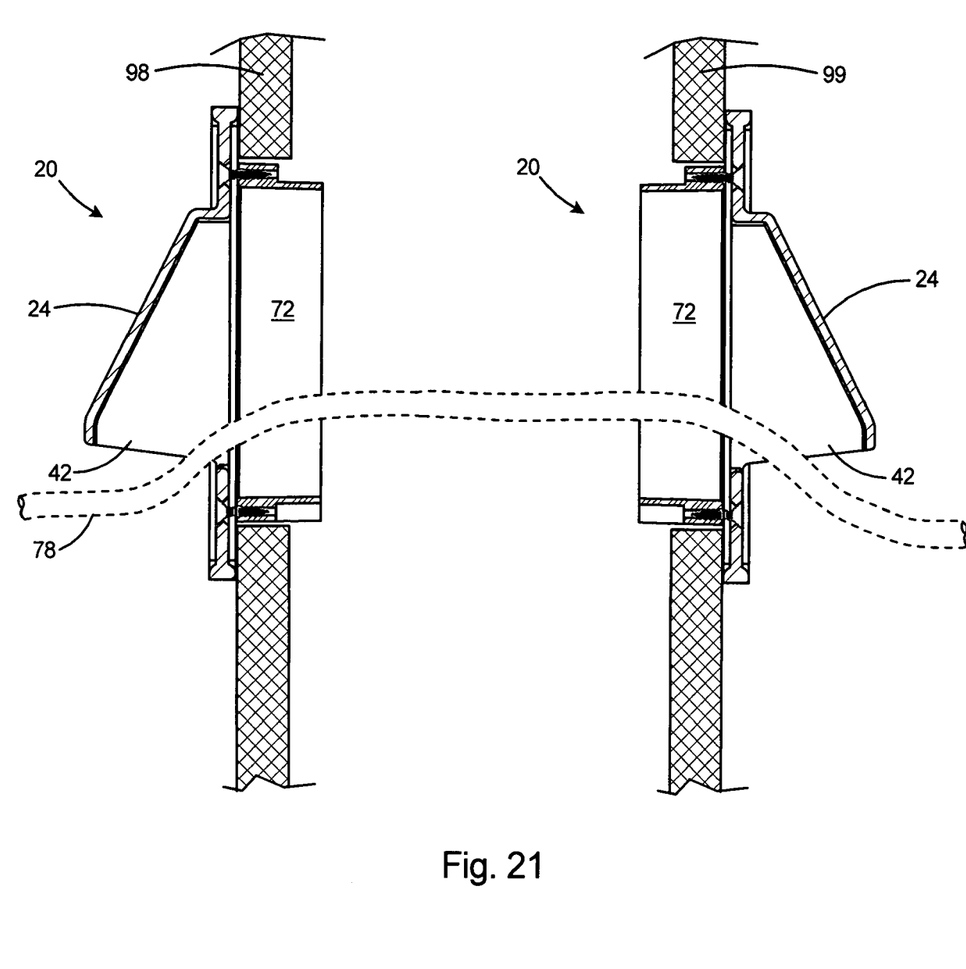
FIG. 21 is a schematic depicting two protective cable chutes of the type shown in FIG. 1 installed on opposite sides of an interior wall and illustrating their use in routing a low voltage cable from one room into an adjacent room.

With reference to FIG. 21 there is shown a schematic depicting two protective cable chutes 20 according to the first embodiment installed on opposite sides of an interior wall and illustrating their use in routing a low voltage cable 78 from one room into an adjacent room. A first protective cable chute 20 is secured to wall 98 and a second protective cable chute 20 is secured on the opposite side on wall 99. The two installed cable chutes 20 enable an installer to run a low voltage cable 78 from one room into the adjacent room. Although both cable chutes 20 are shown mounted in a first configuration with the cable shield 24 extending outward and the cable opening 42 downward, as described hereinabove, the various embodiments of the protective cable chute of the present invention can be mounted in any of four separate configurations depending on the requirements at the job site.

The protective cable chutes 20 and 90 of the present invention, of which a preferred embodiment has been shown and described herein, is preferably molded in one piece of plastic. Thus, as shown in FIG. 1, the cover plate 22 and cable shield 24 are molded in one piece. This enables production of the protective cable chute 20 of the present invention in high speed molding equipment at low unit cost. This provides a protective cable chute 20 that may easily be applied to most conventional electrical boxes or low voltage frames, including those low voltage frames that are clamped onto a wall by the use of a front flange and rotatable flags. The protective cable chute may be molded of various plastics including polycarbonate, polyvinyl chloride, acrylonitrile-butadiene styrene, and polyethylene.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A reversible one-piece protective cable chute for routing cables through a wall comprising:
    a cover plate including a first end and a second end and a front surface and a rear surface;
    an opening in said cover plate;
    a cable shield extending outward from said front surface of said cover plate, said cable shield including two substantially triangular shaped sidewalls and an outer wall, said outer wall and said sidewalls extending to a planar edge;
    a cable opening defined by said planar edge;
    two-way apertures aligned along a vertical axis through said cover plate, said two-way apertures of a spacing and pattern to match the bores of a conventional electrical box or low voltage frame;
    said two-way apertures including countersunk areas on said front surface and on said rear surface of said cover plate; and
    a raised periphery around the outer edge of said cover plate, said raised periphery defining a recessed area on each of said front surface and said rear surface of said cover plate.

2. The reversible one-piece protective cable chute of claim 1 including
    a thin interior plate portion on said cover plate interior of said raised periphery; and
    said recessed area on said front surface of said cover plate extending between said outward extending cable shield and said raised periphery of said cover plate, said recessed area on said rear surface of said cover plate extending between said opening and said raised periphery of said cover plate.

3. The reversible one-piece protective cable chute of claim 1 wherein
    said cover plate is oriented vertically; and
    said planar edge of said cable shield is angled between 5 and 9 degrees above a horizontal axis extending from said cover plate.

4. The reversible one-piece protective cable chute of claim 1 wherein
    said cable shield includes a planar horizontal portion extending from said front surface of said cover plate; and
    said cable shield includes a vertical lip extending downward from said outer wall.

5. The reversible one-piece protective cable chute of claim 1 wherein said cable opening is a trapezoidal shape.

6. The reversible one-piece protective cable chute of claim 5 wherein said sidewalls of said cable shield slope inward at an angle with respect to an axis perpendicular to said front surface of said cover plate.

7. The reversible one-piece protective cable chute of claim 6 wherein said angle of said sidewalls of said cable shield with respect to the axis perpendicular to said front surface of said cover plate is between 10 and 20 degrees.

8. The reversible one-piece protective cable chute of claim 2 wherein said recessed area is recessed a depth of at least 0.065 inch from said raised periphery of said cover plate.

9. The reversible one-piece protective cable chute of claim 1 wherein said cover plate includes two of said two-way apertures; and said two-way apertures are aligned along a vertical axis through said cover plate.

10. The reversible one-piece protective cable chute of claim 1 wherein said cover plate includes four of said two-way apertures; and two of said two-way apertures are aligned along a first vertical axis through said cover plate and two-way apertures are aligned along a second vertical axis through said cover plate.

11. The reversible one-piece protective cable chute of claim 1 wherein said cable chute is mounted to a single-gang electrical box or single-gang low voltage frame.

12. The reversible one-piece protective cable chute of claim 1 wherein said cable chute is mounted to a two-gang electrical box or two-gang low voltage frame.

13. The reversible one-piece protective cable chute of claim 1 wherein said cable chute may be mounted to an electrical box on a wall in any one of four orientations.

14. The reversible one-piece protective cable chute of claim 13 wherein said four orientations include a first orientation with said cable shield extending outward from said electrical box and said cable opening facing downward;

a second orientation with said cable shield extending outward from said electrical box and said cable opening facing upward;

a third orientation with said cable shield extending inward from said electrical box and said cable opening facing downward; and a fourth orientation with said cable shield extending inward from said electrical box and said cable opening facing upward.

15. The reversible one-piece protective cable chute of claim 1 wherein said reversible one-piece protective cable chute is molded in one piece of plastic.

16. The reversible one-piece protective cable chute of claim 15 wherein said plastic is selected from the group including polycarbonate, polyvinyl chloride, acrylonitrile-butadiene styrene, and polyethylene.

* * * * *